US009319430B2

(12) United States Patent
Bell, Jr. et al.

(10) Patent No.: US 9,319,430 B2
(45) Date of Patent: Apr. 19, 2016

(54) MANAGING SOFTWARE DEPLOYMENT

(71) Applicant: International Business Machines Corporation, Armonk, NY (US)

(72) Inventors: Jerome R. Bell, Jr., Hiram, GA (US);
Mari F. Heiser, Vacaville, CA (US);
Heather M. Hinton, Austin, TX (US);
Neil I. Readshaw, Parkwood (AU);
Karthik Sivakumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/306,890

(22) Filed: Jun. 17, 2014

(65) Prior Publication Data
US 2015/0365437 A1     Dec. 17, 2015

(51) Int. Cl.
*H04L 29/06*     (2006.01)
(52) U.S. Cl.
CPC ............ *H04L 63/20* (2013.01); *H04L 63/1433* (2013.01)
(58) Field of Classification Search
CPC .............. G06F 11/3612; G06F 21/577; G06F 2221/033; H04L 43/0817; H04L 63/10; H04L 63/20
See application file for complete search history.

(56) References Cited

U.S. PATENT DOCUMENTS

| 8,261,353 | B2 | 9/2012 | Hirsave et al. | |
| 8,365,261 | B2 * | 1/2013 | Bhattacharyya | ........ H04L 63/10 713/166 |
| 8,613,080 | B2 | 12/2013 | Wysopal et al. | |
| 2005/0257072 | A1 * | 11/2005 | Cross | ...................... H04L 63/06 713/193 |
| 2006/0265598 | A1 * | 11/2006 | Plaquin | ............... H04L 63/0892 713/182 |

OTHER PUBLICATIONS

"Requires installation of untrusted packages?", Ask Ubuntu, pp. 1-2, Mar. 6, 2014, <http://askubuntu.com/questions/184117/requires-installation-of-untrusted-packages>.
"Software Asset Inventory & Tracking Management", Samanage, pp. 1-4, Mar. 13, 2014, <http://www.samanage.com/products/software_inventory.html>.
"Software & Free Downloads", Software.com, pp. 1-5, Mar. 6, 2014, <http://www.software.com/>.
"A Method and System for Software Tagging to Bind Software Provenance for Risk and Lifecycle Management", An IP.com Prior Art Database Technical Disclosure, IP.com Number: 000240183, printed Dec. 14, 2015, 3 pages.

\* cited by examiner

*Primary Examiner* — Amir Mehrmanesh
(74) *Attorney, Agent, or Firm* — Christopher K. McLane; Daniel R. Simek

(57) ABSTRACT

The method includes identifying an instance of software installed. The method further includes determining a fingerprint corresponding to the instance of software installed. The method further includes determining a security risk associated with the instance of software installed. The method further includes identifying a software management policy for the instance of software based upon the fingerprint, security risk, and designated purpose of the computing device. In one embodiment, the method further includes in response to identifying the software management policy, enforcing, by one or more computer processors, the software management policy on the instance of software installed on the computing device.

16 Claims, 4 Drawing Sheets

MANAGING SOFTWARE DEPLOYMENT

BACKGROUND OF THE INVENTION

The present invention relates generally to the field of software management, and more particularly to evaluating software and implementing policy on a computing device that utilizes a software management service.

A software management system, or a package management system, is a collection of software tools that automate the process of installing, upgrading, configuring, and removing software packages that are installed on a computer in a consistent manner. A software management system typically maintains a database of software dependencies and version information to prevent software mismatches and missing prerequisites.

Packages are distributions of software, applications, and data. Packages also contain metadata, such as the software's name, description of the software's purpose, version number, vendor, checksum, and a list of dependencies necessary for software to run properly. Upon installation of a package, the corresponding metadata is stored in a local package database. Packages are often downloaded from a software repository, which is a storage location from which the package may be retrieved and installed on a computer.

SUMMARY

Embodiments of the present invention disclose a method, computer program product, a service, and system for managing software on one or more computing devices. In one embodiment, in accordance with the present invention, the computer implemented method includes identifying an instance of software installed on a computing device. The method further includes determining a fingerprint corresponding to the instance of software installed on a computing device. The method further includes determining a security risk associated with the instance of software installed on a computing device. The method further includes identifying a software management policy for the instance of software based at least in part on the determined fingerprint, the determined security risk associated with the instance of software, and a designated purpose of the computing device. In one embodiment, the method further includes in response to identifying the software management policy, enforcing, by one or more computer processors, the software management policy on the instance of software installed on the computing device.

DETAILED DESCRIPTION

Embodiments of the present invention recognize that methods for managing the software inventory on workstations are limited in a number of ways. A software inventory can range from a singular piece of software located on a device to all software on a network. In an enterprise context where users retain privileged access to their workstation, it may be convenient to define one or more standard repositories for obtaining trusted software but not enforceable because users still retain privileged access to their workstation, thereby enabling them to download software not located in a standard repository. A falsely high level of confidence in packages published in the same repository may be a downside if software is deemed secure based on source location alone. When an emergency scenario occurs, and the risk of installing and using an unknown version of software may be justified, a binary view of suitability of software source location may not be suitable. Software with a valid checksum or signed by a reputable entity may present an unanticipated risk if the software creator or publisher is compromised. What is needed is a more flexible method for managing a secure software inventory in balance with real world requirements.

Figure 1:
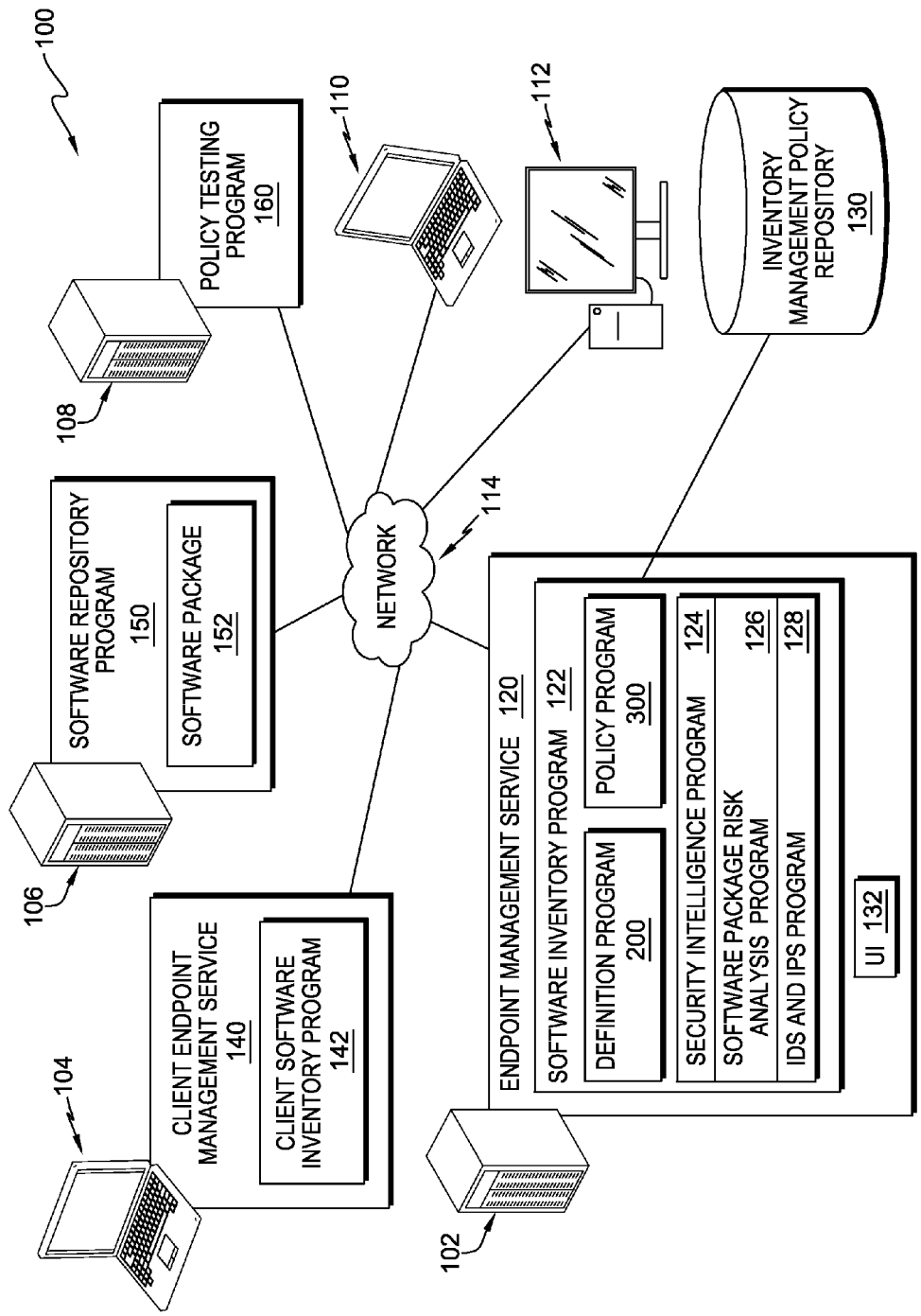
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server computer 102 and client computers 104, 110, 112, software repository server 106, and policy testing server 108 all interconnected over network 114. Any of the components of the present invention could be deployed, managed, serviced, etc. by a service provider who offers software management.

In general, network 114 can be any combination of connections and protocols that will support communications between server computer 102, client computers 104, 110, 112, software repository server 106, and policy testing server 108, in accordance with embodiments of the present invention. Network 114 can include, for example, a local area network (LAN), a wide area network (WAN) such as the Internet, a cellular network, or any combination of the preceding and can further include wired, wireless, and/or fiber optic connections.

In example embodiments, server computer 102 may be a desktop computer, a laptop computer, a tablet computer, a specialized computer server, a smartphone, a gaming system, or any other computer system known in the art. In certain embodiments, server computer 102 represents a computer system utilizing clustered computers and components (e.g., database server computers, application server computers, etc.) that act as a single pool of seamless resources when accessed through network 114, as is common in data centers and with cloud computing applications. In general, server computer 102 is representative of any programmable electronic device or combination of programmable electronic devices capable of executing machine readable program instruction and communicating with client computers 104, 110, 112, software repository server 106, and policy testing server 108 via network 114. Exemplary components of server computer 102 are described in greater detail with regard to FIG. 4.

In various embodiments of the present invention, client computers 104, 110, and 112 may be a desktop computer, a laptop computer, a tablet computer, a specialized computer server, a smartphone, a gaming system, or any other computer system known in the art. In certain embodiments, client computers 104, 110, and 112 represent a computer system utilizing clustered computers and components (e.g., database server computers, application server computers, etc.) that act as a single pool of seamless resources when accessed through network 114, as is common in data centers and with cloud computing applications. In general, client computers 104, 110, and 112 are representative of any programmable electronic device or combination of programmable electronic devices capable of executing machine readable program instruction and communicating with server computer 102, software repository server 106, and policy testing server 108 via network 114. Exemplary components of client computers 104, 110, and 112 are described in greater detail with regard to FIG. 4.

Software repository server 106 may be a desktop computer, a laptop computer, a tablet computer, a specialized computer server, a smartphone, a gaming system, or any other computer system known in the art. In certain embodiments, software repository server 106 represents a computer system utilizing clustered computers and components that act as a single pool of seamless resources when accessed through network 114, as is common in data centers and with cloud computing applications. In general, software repository server 106 is representative of any programmable electronic device or combination of programmable electronic devices capable of executing machine readable program instructions and communicating with client computers 104, 110, 112, server computer 102, and policy testing server 108 via network 114. Exemplary components of software repository server 106 are described in greater detail with regard to FIG. 4.

In various embodiments of the present invention, policy testing server 108 may be a desktop computer, a laptop computer, a tablet computer, a specialized computer server, a smartphone, a gaming system, or any other computer system known in the art. In certain embodiments, policy testing server 108 represents a computer system utilizing clustered computers and components (e.g., database server computers, application server computers, etc.) that act as a single pool of seamless resources when accessed through network 114, as is common in data centers and with cloud computing applications. In general, policy testing server 108 is representative of any programmable electronic device or combination of programmable electronic devices capable of executing machine readable program instructions and communicating with client computers 104, 110, 112, software repository server 106, and server computer 102 via network 114. In another embodiment, policy testing server 108 may be representative of an environment that includes a plurality of computing devices that can be used to test new policy. In one example, the policy may be to remove software, and a test could determine how that would affect a workstation. Policy testing program 160 is located on policy testing server 108. Policy testing program 160 is a test program in which implementations of software inventory program 122 can be simulated prior to deployment on a client computer. Exemplary components of policy testing server 108 are described in greater detail with regard to FIG. 4.

Endpoint management service 120 resides on server computer 102 and facilitates communications with client computers 104, 110, and 112. Client endpoint management service 140 is located on client computer 104 and identifies and sends communications in response to a request to download software on client computer 104 to endpoint management service 120 located on server computer 102. In one embodiment, server computer 102 is a server computer system accessible to a plurality of users of endpoint management service 120 (e.g., client computers 104, 110, and 112). In such an embodiment, user interface 132 may be a Web-based user interface accessible to users of each respective client computer via network 114. For example, server computer 102 receives a notification that client computer 104 is requesting a download of software package 152 from software repository server 106. Server computer 102 can receive the notification by way of any suitable network (e.g., network 114). In various embodiments, server computer 102 can display information to a user of server computer 102 via user interface 132. In some embodiments, a user of server computer 102 can input instructions to server computer 102 via user interface 132.

Inventory management policy repository 130 can be implemented with any type of storage device, for example, persistent storage 408, which is capable of storing data that can be accessed for use by client computers 104, 110, and 112, policy testing server 108, and server computer 102, such as a database server, a hard disk drive, or a flash memory. In other embodiments, inventory management policy repository 130 can represent multiple storage devices within server computer 102.

Software inventory program 122 resides on server computer 102 and facilitates maintenance of inventory management policy repository 130, as well as the distribution of information in software repository server 106, and client computers 104, 110, and 112. Client software inventory program 142 resides on client computer 104 and communicates with software inventory program 122 located on server computer 102. Software inventory program 122 monitors requests sent to endpoint management service 120 (e.g., client computer 104 attempting to download new software). In one embodiment, software inventory program 122 includes security intelligence program 124, software package risk analysis (SPRA) program 126, intrusion detection system (IDS) and intrusion prevention system (IPS) program 128, definition program 200, and policy program 300. The aforementioned programs generate the fingerprint of the software as well as the risk score, which can be stored in inventory management policy repository 130. A risk score could also be referred to as a security risk associated with an instance of software. In another embodiment, security intelligence program 124, SPRA program 126, and IDS and IPS program 128 may be independent programs that communicate with software inventory program 122. In example embodiments, definition program 200 generates the fingerprint and risk score for software package 152, and then stores the information in inventory management policy repository 130 for use by policy program 300. Policy program 300 determines if other client computers (e.g., client computers 104, 110, 112, or other client computers not shown in the environment) contain software similar to software package 152 and implements a determined policy on client computer 104 as well as other client computers with similar software.

As depicted, software inventory program 122 is a subprogram or routine of endpoint management service 120. In an alternative embodiment, software inventory program 122 may be independent of endpoint management service 120 and capable of communicating with endpoint management service 120 and inventory management policy repository 130. In some embodiments software inventory program 122 may monitor attempted downloads on multiple endpoint management services to identify additional software packages and store the additional information in inventory management policy repository 130.

In one embodiment, security intelligence program 124 serves as a risk advisory program. As an environment changes and evolves, the specific applicability of information on a vulnerability list of security intelligence program 124 regarding software package 152 changes accordingly. An example of a vulnerability list would be known software packages that contain risks to a computing device. In one embodiment, the vulnerability list is created by security intelligence program 124. Additionally, SPRA program 126 compares the vulnerability threat against the business needs of the use of software package 152. In one embodiment, SPRA program 126 may identify vulnerabilities in software packages. The discovery of a new vulnerability, combined with information about the vulnerability, modifies the risk. IDS and IPS program 128 may indicate real-time exploits of a known or unknown vulnerability and then adjust the risk level associated with software package 152 accordingly.

Software repository program 150, located on software repository server 106, is a program from which client computers 104, 110, and 112 can install software such as software package 152. In another embodiment, software repository program 150 could be a site that publishes software to be downloaded in a fashion de-coupled from how it is installed. In example embodiments, software package 152 can be a word processing program, a patch for a computer operating system, a video game, or any other software update, program, or code that is capable of being implemented on client computer 104.

Figure 2:
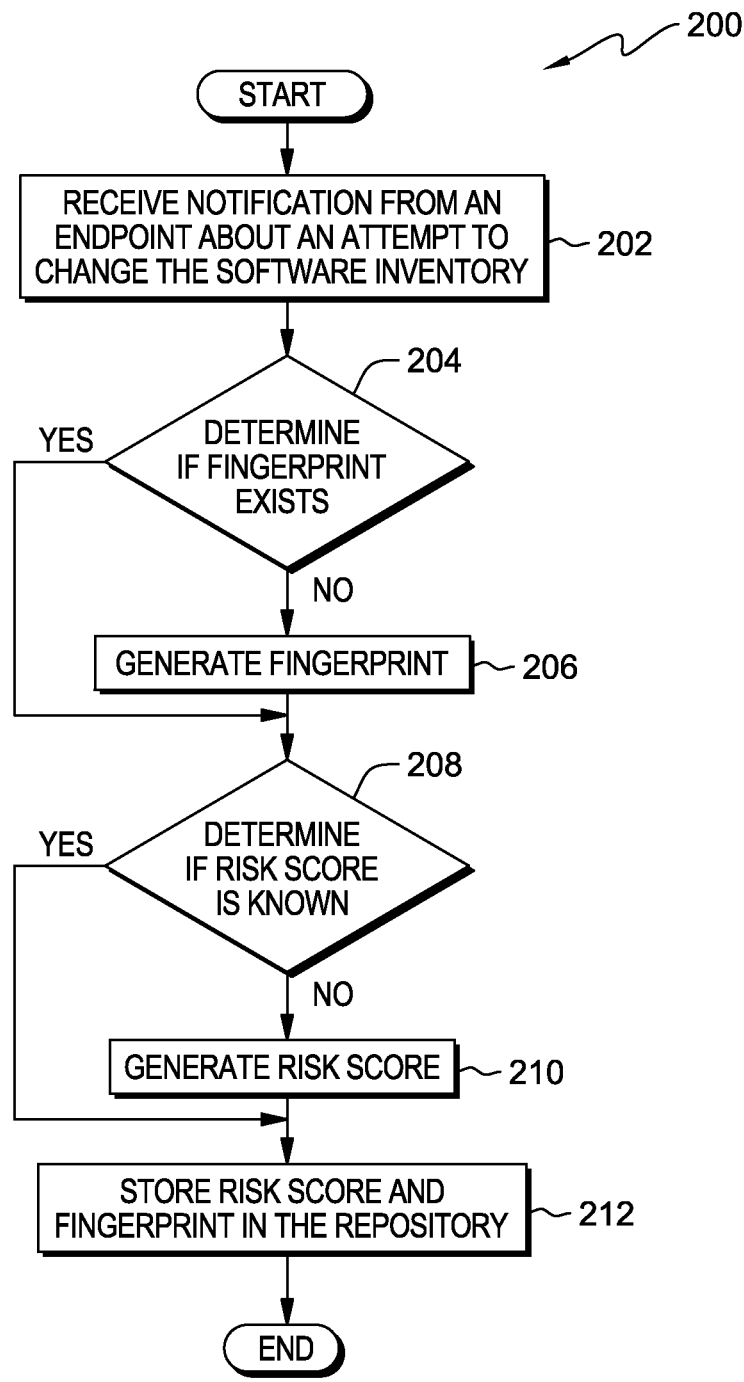
FIG. 2 is a flowchart depicting operational steps of a program for identifying and installing relevant software updates based on usage data corresponding to a software product, on a server computer within the data processing environment of FIG. 1, in accordance with an embodiment of the present invention.

FIG. 2 is a flowchart depicting operational steps of definition program 200 for identifying and installing relevant software updates based on usage data corresponding to a software product, on a server computer within the data processing environment of FIG. 1, in accordance with an embodiment of the present invention. In one embodiment, definition program 200 operates on server computer 102 to define fingerprints and risk evaluations (e.g., for software package 152 downloading on client computer 104).

Definition program 200 receives a notification from an endpoint about an attempt to change the software inventory (step 202). In an embodiment, definition program 200 receives a notification from client computer 104 that a user is attempting to download software package 152. Changes to the software inventory may comprise attempts to download new software packages, patches, files, etc. Changes may also comprise software from disks, externals drive, and may also comprise programs written on client computer 104.

In an embodiment, a user of client computer 104 requests to download software package 152 from software repository server 106. In one embodiment, client software inventory program 142, located on client computer 104, sends a notification to definition program 200. In another embodiment, client software inventory program 142 determines that a user of client computer 104 is attempting to download software package 152. Client software inventory program 142 notifies client endpoint management service 140. Client endpoint management service 140 then sends a notification to endpoint management service 120. In one embodiment, definition program 200 utilizes the received notification, which can include metadata pertaining to program origin, code, type, or any other identifying characteristics of software package 152 known in the art. In another embodiment, the received notification provides definition program 200 with an indication of an attempted change in the software inventory of client computer 104. In yet another embodiment, software inventory program performs a scan of client computer 104 for software that was not present during the last scan. The software scan can be performed at regular intervals, such as weekly, daily, hourly, or in real time. Additional on-demand triggers could also be performed, such as a newly discovered security risk that should be addressed immediately.

Definition program 200 determines whether a fingerprint exists for software package 152, which will change the software inventory of client computer 104 (decision 204). In one embodiment, metadata associated with software package 152 can indicate a fingerprint was generated previously by definition program 200. A fingerprint is an individual description of software that has been created for the specific instance of software. In another embodiment, definition program 200 determines if software package 152 has an existing associated fingerprint stored in inventory management policy repository 130.

Responsive to determining that no fingerprint is associated with software package 152 (no branch, decision 204), definition program 200 generates a fingerprint corresponding to a proposed change to the software inventory on client computer 104 (step 206). In an embodiment, definition program 200 queries client computer 104 to generate the fingerprint of software package 152. In another embodiment, definition program 200 can download software package 152 on server computer 102 to generate the fingerprint. In yet another embodiment, definition program 200 queries software repository server 106 to generate a fingerprint. In an example embodiment, definition program 200 generates the fingerprint based on a set of attributes, for example, using an existing algorithm such as a simple checksum, expected cryptographic signature, or a more complex combination of attributes that encompass the uniqueness of the software, such as a hash of attributes of files in the software package, stated software version, and source location from where software is currently found. In an example, source location for open source/freeware can be multiple different sites and repositories accessed via the Internet. In various embodiments of the invention, definition program 200 can utilize a collection of all the aforementioned fingerprinting techniques when determining software fingerprints.

In response to definition program 200 determining that a fingerprint has already been generated for software package 152 (yes branch, decision 204), or generating a fingerprint (step 206), definition program 200 determines if a risk score is known for software package 152 (decision 208). In an embodiment, metadata is associated with software package 152 that indicates that a risk score has previously been generated by definition program 200. In another embodiment, definition program 200 determines if software package 152 already has an associated risk score stored in inventory management policy repository 130.

In response to determining that no risk score is associated with software package 152 (no branch, decision 208), definition program 200 generates a risk score for software package 152 (step 210). Risk rating level is a dynamic factor, which in certain embodiments indicates the necessity of the software to a business, the type of software package (e.g., open source, freeware, trial software), and community or enterprise versions of the same software package. In certain embodiments, definition program 200 also determines the source licensing for open source, or personal distribution software, the number of components within a software package, any known current or past vulnerabilities associated with the components, and the known current or past evidence of a vulnerability. In an embodiment, the risk score may also take into account the aggregate risk score for all software deployed on a workstation. In an example, a work station with a low overall risk score can download a high-risk package in an emergency. Conversely, if the overall risk score for the workstation is high because of other high or medium risk software packages located on the workstation, the workstation cannot download the software package. In an embodiment, when determining a risk score, definition program 200 identifies the security of software package 152. In an example, definition program 200 performs a risk evaluation utilizing security intelligence program 124 that allocates a rating number towards a final risk score. Security intelligence program 124 serves as a source of risk advisory information so that as environment 100 changes over time, the specific applicability of a vulnerability list corresponding to software package 152 changes also.

In one embodiment, the criticality of the risk score is normalized against the business criticality of the use of software package 152 by SPRA program 126. In an example, SPRA program 126 may assign a risk score number that is used to generate the final risk score. In another example, SPRA program 126 identifies vulnerabilities in software package 152, new or known, and combines all generated characteristics to calculate a risk score. In another embodiment, IDS and IPS program 128 indicates real-time exploits of a known or unknown vulnerability of a given software package and provides this as input to the risk score calculation and value associated with software package 152. In one embodiment, definition program adds all risk scores from security intelligence program 124, SPRA program 126, IDS and IPS program 128, and various other programs to generate a final risk score associated with software package 152. In an alternate embodiment, security intelligence program 124, SPRA program 126, and IDS and IPS program 128 may be independent programs that send and receive information to and from definition program 200 located on server computer 102.

In response to determining if a risk score is already known (yes branch, decision 208), or determining a risk score (step 210), definition program 200 stores the risk score and fingerprint for software package 152 in inventory management policy repository 130 (step 212). In one embodiment, a software fingerprint or risk score is stored in inventory management policy repository 130 by the date that the fingerprint or risk score was calculated. In another embodiment, software fingerprints and risk scores are stored in inventory management policy repository 130 by type, size, or likelihood of use. In yet another embodiment, risk scores and fingerprints can be stored together along with other defining characteristics of software package 152. In an embodiment, when definition program 200 generates and stores a new fingerprint and risk score in inventory management policy repository 130, software inventory program 122 initiates policy program 300.

Figure 3:
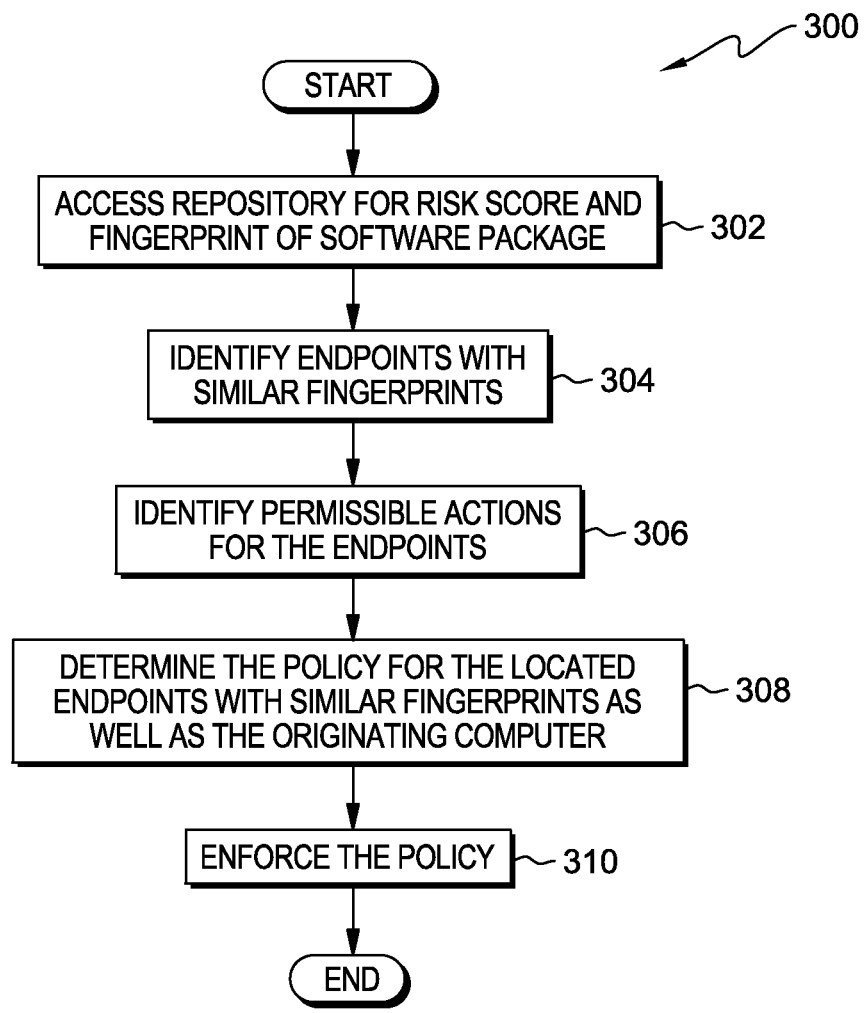
FIG. 3 is a flowchart depicting additional operational steps of a program for identifying and installing relevant software updates based on usage data corresponding to a software product, on a server computer within the data processing environment of FIG. 1, in accordance with an embodiment of the present invention.

FIG. 3 is a flowchart depicting operational steps of policy program 300, in accordance with an embodiment of the present invention. In one embodiment, definition program 200 operates on server computer 102 to define and enforce software policy on client devices (e.g., for software package 152 downloading on client computer 104). In one embodiment, upon the attempt to change the software inventory on client computer 104 by downloading software package 152, policy program 300 begins. In another embodiment, policy program 300 starts after a fingerprint and risk score has been stored in inventory management policy repository 130.

Policy program 300 accesses inventory management policy repository 130 to identify the risk score and the fingerprint of software package 152 (step 302). In an embodiment, policy program 300 accesses inventory management policy repository 130 when a risk score is generated and stored in inventory management policy repository 130 and identifies the fingerprint associated with the risk score. In another embodiment, policy program 300 identifies similar fingerprints located in inventory management policy repository 130 when a new risk score and fingerprint is stored. In yet another embodiment, policy program 300 accesses inventory management policy repository 130 when either a risk score or fingerprint is stored. In one embodiment, policy program 300 accesses inventory management policy repository 130 at preset intervals to locate new fingerprints or risk scores. In another embodiment, policy program 300 accesses the inventory any time the software inventory is changed on client computer 104.

Policy program 300 identifies endpoints with similar fingerprints to software package 152 (step 304). In one embodiment, policy program 300 queries client computers 104, 110, and 112 to identify software with similar fingerprints to software package 152 located on client computers 104, 110, and 112. In one embodiment, the risk score of software package 152 will be associated with the identified software on client computers 104, 110, and 112. In another embodiment, policy program 300 identifies fingerprints similar to software package 152 stored in inventory management policy repository 130. In an example, the identified fingerprints may have metadata that connects the identified fingerprints to the client computer for which the identified fingerprints were generated, thereby identifying the endpoint with a similar fingerprint. In an embodiment, a software inventory of client computer 104 may include pointers to the fingerprints and risk scores for each individual package that is deployed on a given workstation. In another embodiment, software inventory program 122 can store a risk score that was generated at the time the software was deployed in inventory management policy repository 130 which allows for a change in the risk score to be reflected in the cumulative/aggregate risk score for the software packages deployed on a given workstation. In an embodiment, policy program 300 identifies similar fingerprints in inventory management policy repository 130. Policy program 300 then queries client computers 104, 110, and 112 to determine if software fingerprints are located on the computers similar to the identified software fingerprints from inventory management policy repository 130. Examples of software with similar fingerprints include, but are not limited to, the same program downloaded from a site other than the approved site, software intended to only be deployed on an Internet facing device but is deployed on an Internet facing device, software could be the same program but different major/minor release, software could be trial version versus licensed version, etc. If no endpoints containing a similar fingerprint to software package 152 are located, policy program 300 progresses with software package 152 and client computer 104 alone.

Policy program 300 identifies the permissible actions to take for located endpoints that contain similar fingerprints to software package 152 as well as client computer 104 (step 306). In an embodiment, permissible actions include freedom to change the software inventory depending on the specific job of a user of a client computer, software that is only applicable for a certain group or division of users, or limitations based on the client computer. In one embodiment, the permissible actions are based on credentials of a user, and the credential of a computer. In an embodiment, policy program 300 accesses inventory management policy repository 130 to identify permissible actions each endpoint may take according to previously provided client computer information, metadata associated with fingerprints, or a list of permissible actions for each endpoint under endpoint management service 120. In another embodiment, policy program 300 queries an endpoint (e.g., client computer 104) to determine permissible actions that may have been set by client endpoint management service 140. In one embodiment, once permissible actions have been identified, policy program 300 may store the permissible actions in inventory management policy repository 130 along with the risk score of software package 152.

Policy program 300 determines the policy for the located endpoints with similar fingerprints to software package 152, as well as for client computer 104 (step 308). In an embodiment, the identified endpoints from step 304 as well as client computer 104 may have different permissible actions for each instance of software. In an example, a first employee is allowed to have any package of software on the computer as opposed to a second employee that needs approval for software. In such a case, the first employee would be able to have software with the maximum risk score where the second employee would have a threshold risk score that may prevent the second employee from having the same software on the second employee's computer. In certain embodiments, the range of actions for a policy that may be determined include allowing software to run without restrictions, uninstalling software because an instance with this fingerprint is suspected to contain malware, scheduling uninstallation of software after a period of time because the fingerprint was unknown but comes from a location that is generally trusted, uninstalling, unless the software is being installed into a one-time use privileged admin virtual workstation or other risk reducing containerization, or updating software to version known to have an acceptable risk score. In one embodiment certain actions may be generated for a cyber-security team to subsequently analyze the version of software, decide on a revised action, and update inventory management policy repository 130. In an embodiment, compartmentalization of software package 152 is determined from a variety of means such as application programing interface calls or knowing that workstations in a particular IP address range are virtual desktops. In another embodiment, audit events are generated for later use by cyber teams for actions related to new software. In an embodiment, a default action may also be required defining policy or being hard-coded into software inventory program 122 (e.g., permit all or uninstall all). Policy program 300 determines the policy for the endpoints as well as client computer 104 based on the specific computers allowable actions as pertaining to the risk score of the instance of software.

Policy program 300 enforces the determined policy from step 308 on the endpoints with similar fingerprints to software package 152 as well as client computer 104 (step 310). In an embodiment, policy program 300 sends a notification to client endpoint management service 140 located on client computers 104, 110 and 112 to enforce the policy that was determined in step 308 on each individual client computer. In one embodiment, policy program 300 actively enforces the determined policy on the identified endpoints. In this embodiment, server computer 102 logs onto client computer 104 and enforces policy. In another embodiment, policy program 300 stores the policy for software, identified in step 304, with instruction for client endpoint management service 140. In this embodiment, a subsequent time an endpoint queries endpoint management service 120, endpoint management service 120 can send the instructions on management policy to the endpoint.

In an example embodiment, software inventory program 122 receives a notification that client computer 104 with client endpoint management service 140 is attempting to install software package 152 on client computer 104 (step 202). In this example, software inventory program 122 determines a fingerprint and risk score if none was previously associated with the instance of software that is creating the change, such as software package 152 (steps 206 and 210). Further, software inventory program 122 stores these determinations in inventory management policy repository 130 (step 212). Software inventory program 122 then identifies that client computers 110 and 112 have instances of software with similar fingerprints (step 304). The risk score determined for software package 152 becomes associated with the software on client computers 110 and 112 with the similar fingerprint. Once the instances of software with similar fingerprints have been located and assigned with the risk score of software package 152, software inventory program 122 identifies permissible actions for client computers 104, 110, and 112 (step 306). The permissible actions are determined based on the purpose of the client computers 104, 110, and 112, employee clearance associated with the users of client computers 104, 110, and 112, and the cumulative/aggregate risk score of all currently deployed software packages on each client computer. Software inventory program 122 then determines what policy will be implemented on client computers 104, 110, and 112 (step 308). This determination is made by weighing the possible actions against the risk score that was determined. The policies can range from preventing a change on any or all client computers to complete allowance by any or all client computers. Once the policy is determined, an enforcement of the policy takes place on the endpoints, directed by server computer 102 (step 310). Software inventory program 122 sends a notification to client endpoint management service 140, located on client computer 104, which then implements the policy on client computer 104. Subsequently, the policy is implemented on policy testing server 108 to determine if there are any unforeseen issues that may arise on client computers 104, 110, and 112.

In another embodiment, the invention provides a business method that performs the process steps of the invention on a subscription, advertising, and/or fee basis. That is, a service provider, such as a Solution Integrator, could offer to software management. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Figure 4:
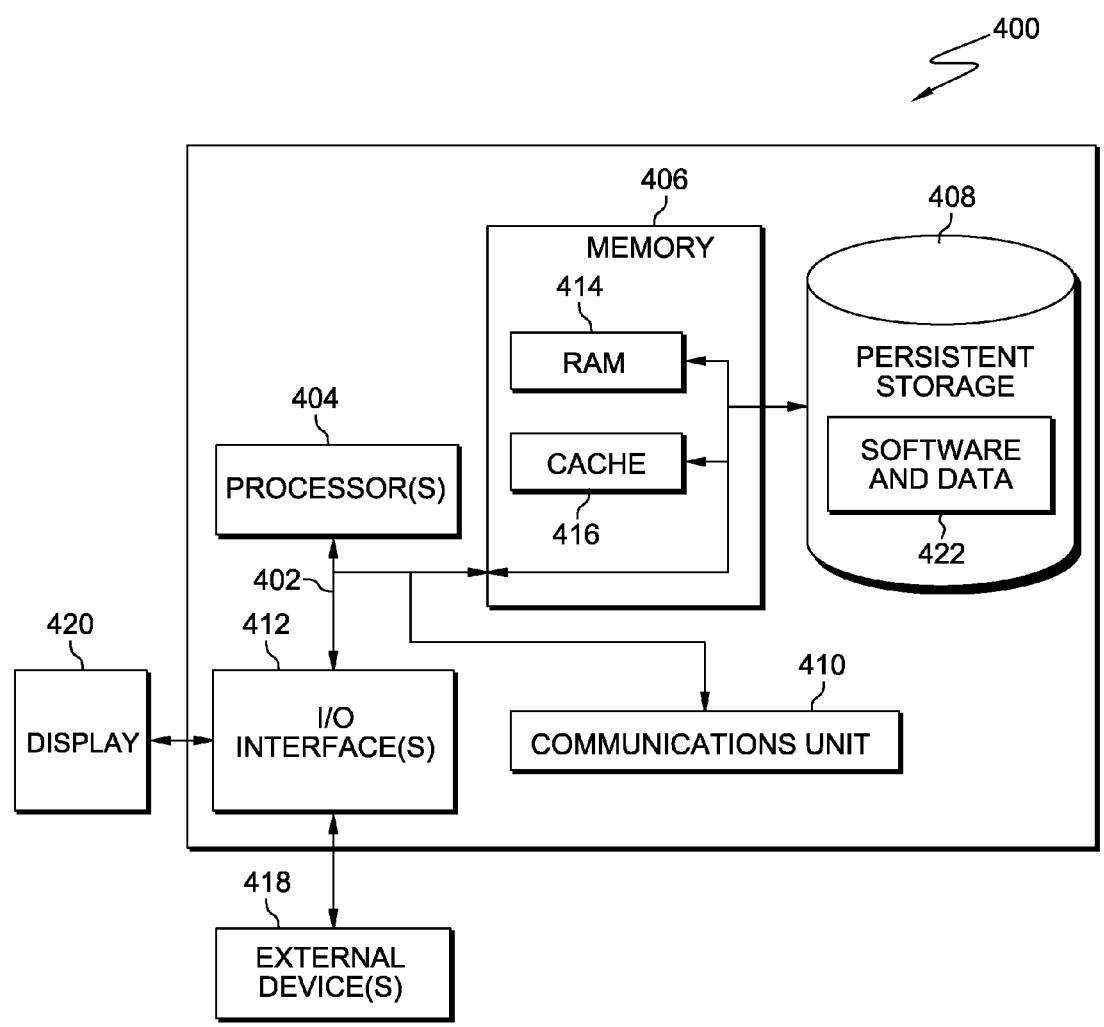
FIG. 4 depicts a block diagram of components of the computing system of FIG. 1, in accordance with an embodiment of the present invention.

FIG. 4 depicts a block diagram of components of computer 400, which is representative of server computer 102 and client computers 104, 110, and 112, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to client computers 104, 110, and 112, software and data 422 represents client endpoint management service 140 and client software inventory program 142. With respect to server computer 102, software and data 422 represents endpoint management service 120, software inventory program 122, definition program 200, policy program 300, security intelligence program 124, SPRA 126, IDS and IPS program 128, inventory management policy repository 130, and UI 132.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, a service and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing software on one or more computing devices, the method comprising:
identifying, by one or more computer processors, an instance of software installed on a computing device;
determining, by one or more computer processors, a fingerprint corresponding to the instance of software installed on the computing device;
determining, by one or more computer processors, a security risk associated with the instance of software installed on the computing device;
identifying, by one or more computer processors, a software management policy for the instance of software based, at least in part, on the determined fingerprint, the determined security risk associated with the instance of software, and a designated purpose of the computing device;
wherein identifying a software management policy for the instance of software based, at least in part, on the designated purpose of the computing device, comprises:
identifying, by one or more computer processors, one or more software management policies for the instance of software based, at least in part, on a set of credentials for a user of the computing device, and a set of credentials for the computing device; and
determining, by one or more computer processors, a software management policy from the one or more identified software management policies to implement based, at least in part, on the set of credentials for the user of the computing device, and the set of credentials for the computing device.

2. The method of claim 1, further comprising:
in response to identifying the software management policy, enforcing, by one or more computer processors, the software management policy on the instance of software installed on the computing device, wherein the software management policy comprises one or more of: allowing the instance of software to operate without restrictions, uninstalling the instance of software, scheduling uninstallation of the instance of software after a period of time, uninstalling the instance of software unless the instance of software is being installed into a temporary use privileged admin virtual workstation or other risk reducing containerization, and updating the instance of software to version known to have an acceptable security risk.

3. The method of claim 1, wherein determining the fingerprint for the instance of software on the computing device, comprises:
identifying, by one or more computer processors, one or more attributes for the instance of software based, at least in part, on one or more of using a checksum, using an expected cryptographic signature, using a hash of attributes of files in the instance of software, using a stated software version, and using a source location for the instance of software; and
determining, by one or more computer processors, the fingerprint based on at least one of the one or more identified attributes of the instance of software.

4. The method of claim 1, wherein determining the security risk associated with the instance of software based upon the determined fingerprint for the instance of software on the computing device, comprises:
identifying, by one or more computer processors, one or more attributes for the instance of software based, at least in part, on one or more security risks that include at least one of a necessity of the software to a business, a type of software package, one or more other versions of the instance of software, a source licensing for open source, a number of components within an instance of software, any known current or past vulnerabilities associated with the components of the instance of software, and a known current or past evidence of a vulnerability of the instance of software; and determining, by one or more computer processors, the security risk based, at least in part, on at least one of the one or more identified attributes of the instance of software.

5. The method of claim 1, further comprising:

identifying, by one or more computer processors, a second computing device that includes a second instance of software that has a similar fingerprint to the determined fingerprint corresponding to the instance of software installed on the computing device;

identifying, by one or more computer processors, a second software management policy on the second computing device that includes the second instance of software based, at least in part, on the security risk; and in response to identifying the second software management policy, enforcing, by one or more computer processors, the second software management policy on the second instance of software.

6. The method of claim 1, further comprising:

determining, by one or more computer processors, the security risk associated with the computing device based, at least in part on, one or more instances of software installed on the computing device; and determining whether a second instance of software can be added to the computing device based upon the security risk associated with the computing device.

7. A computer program product for managing software on one or more computing devices, the computer program product comprising:

one or more computer readable storage memory and program instructions stored on the one or more computer readable storage memory, the program instructions comprising:

program instructions to identify an instance of software installed on a computing device;

program instructions to determine a fingerprint corresponding to the instance of software installed on the computing device;

program instructions to determine a security risk associated with the instance of software based on the determined fingerprint corresponding to the instance of software installed on the computing device;

program instructions to identify a possible action from one or more possible actions that the computing device can implement for the instance of software based upon the fingerprint, the security risk, and a designated purpose of the computing device;

wherein the program instructions to identify a software management policy for the instance of software based, at least in part, on the designated purpose of the computing device, comprise program instructions to:

identify one or more software management policies for the instance of software based, at least in part, on a set of credentials for a user of the computing device, and a set of credentials for the computing device; and determine a software management policy from the one or more identified software management policies to implement based, at least in part, on the set of credentials for the user of the computing device, and the set of credentials for the computing device.

8. The computer program product of claim 7, further comprising program instructions to:

in response to identifying the software management policy, enforce the software management policy on the instance of software installed on the computing device, wherein the software management policy comprises one or more of: allowing the instance of software to operate without restrictions, uninstalling the instance of software, scheduling uninstallation of the instance of software after a period of time, uninstalling the instance of software unless the instance of software is being installed into a temporary use privileged admin virtual workstation or other risk reducing containerization, and updating the instance of software to version known to have an acceptable security risk.

9. The computer program product of claim 7, wherein the program instructions to determine a fingerprint corresponding to the instance of software installed on the computing device, comprise program instructions to:

identify one or more attributes for the instance of software based, at least in part, on one or more of using a checksum, using an expected cryptographic signature, using a hash of attributes of files in the instance of software, using a stated software version, and using a source location for the instance of software; and determine the fingerprint based on at least one of the one or more identified attributes of the instance of software.

10. The computer program product of claim 7, wherein the program instructions to determine the security risk associated with the instance of software based on the determined fingerprint corresponding to the instance of software installed on the computing device, comprise program instructions to:

identify one or more attributes for the instance of software based, at least in part, on one or more security risks that include at least one of a necessity of the software to a business, a type of software package, one or more other versions of the instance of software, a source licensing for open source, a number of components within an instance of software, any known current or past vulnerabilities associated with the components of the instance of software, and a known current or past evidence of a vulnerability of the instance of software; and determine the security risk based, at least in part, on at least one of the one or more identified attributes of the instance of software.

11. The computer program product of claim 7, further comprising program instructions to:

identify a second computing device that includes a second instance of software that has a similar fingerprint to the determined fingerprint corresponding to the instance of software installed on the computing device;

identify a second software management policy on the second computing device that includes the second instance of software based, at least in part, on the security risk; and in response to identifying the second software management policy, enforce, the second software management policy on the second instance of software.

12. A computer system for managing software on one or more computing devices, the computer system comprising:

one or more computer processors;

one or more computer readable storage memory;

program instructions stored on the computer readable storage media for execution by at least one of the one or more computer processors, the program instructions comprising:

program instructions to identify an instance of software installed on a computing device;

program instructions to determine a fingerprint corresponding to the instance of software installed on the computing device;

program instructions to determine a security risk associated with the instance of software based on the determined fingerprint corresponding to the instance of software installed on the computing device;

program instructions to identify a possible action from one or more possible actions that the computing device can implement for the instance of software based upon the fingerprint, the security risk, and a designated purpose of the computing device;

wherein the program instructions to identify a software management policy for the instance of software based, at least in part, on the designated purpose of the computing device, comprise program instructions to:

identify one or more software management policies for the instance of software based, at least in part, on a set of credentials for a user of the computing device, and a set of credentials for the computing device; and determine a software management policy from the one or more identified software management policies to implement based, at least in part, on the set of credentials for the user of the computing device, and the set of credentials for the computing device.

13. The computer system of claim 12, further comprising:
program instructions, stored on at least one of the one or more computer readable storage media, to, in response to identifying the software management policy, enforce, by one or more computer processors, the software management policy on the instance of installed on the computing device, wherein the software management policy comprises one or more of: allowing the instance of software to operate without restrictions, uninstalling the instance of software, scheduling uninstallation of the instance of software after a period of time, uninstalling the instance of software unless the instance of software is being installed into a temporary use privileged admin virtual workstation or other risk reducing containerization, and updating the instance of software to version known to have an acceptable security risk.

14. The computer system of claim 12, wherein the program instructions to determine a fingerprint corresponding to the instance of software installed on the computing device, comprise program instructions to:

identify one or more attributes for the instance of software based, at least in part, on one or more of using a checksum, using an expected cryptographic signature, using a hash of attributes of files in the instance of software, using a stated software version, and using a source location for the instance of software; and determine the fingerprint based on at least one of the one or more identified attributes of the instance of software.

15. The computer system of claim 12, wherein the program instructions to determine the security risk associated with the instance of software based on the determined fingerprint corresponding to the instance of software installed on the computing device, comprise program instructions to:

identify one or more attributes for the instance of software based, at least in part, on one or more security risks that include at least one of a necessity of the software to a business, a type of software package, one or more other versions of the instance of software, a source licensing for open source, a number of components within an instance of software, any known current or past vulnerabilities associated with the components of the instance of software, and a known current or past evidence of a vulnerability of the instance of software; and determine the security risk based, at least in part, on at least one of the one or more identified attributes of the instance of software.

16. The computer system of claim 12, further comprising program instructions to:

identify a second computing device that includes a second instance of software that has a similar fingerprint to the determined fingerprint corresponding to the instance of software installed on the computing device;

identify a second software management policy on the second computing device that includes the second instance of software based, at least in part, on the security risk; and in response to identifying the second software management policy, enforce, the second software management policy on the second instance of software.

* * * * *